United States Patent [19]
Flanigan et al.

[11] 3,899,877
[45] Aug. 19, 1975

[54] GAS TURBINE ENGINE POWER SHIFT TRANSMISSION POWER TRAIN

[75] Inventors: Eugene E. Flanigan, Carmel;
Quinton L. Heintzelman, Indianapolis; James M. Ricketts, Oxford, all of Mich.

[73] Assignee: General Motors Corporation, Detroit, Mich.

[22] Filed: July 2, 1973

[21] Appl. No.: 375,917

[52] U.S. Cl. ...... 60/39.14; 60/39.16 SI; 60/39.28 R; 60/39.28 P; 74/DIG. 5; 74/850; 123/179 K
[51] Int. Cl. .............................................. F02c 7/26
[58] Field of Search............... 60/39.16, 39.25, 39.2, 60/39.13, 39.14; 74/DIG. 5, 850; 123/179 K

[56] References Cited
UNITED STATES PATENTS

| | | | |
|---|---|---|---|
| 3,073,179 | 1/1963 | Christenson | 74/645 |
| 3,237,404 | 3/1966 | Flanigan | 60/39.16 SI |
| 3,521,446 | 7/1970 | Maljanian | 60/39.25 X |
| 3,529,419 | 9/1970 | Reed | 60/39.25 X |
| 3,574,288 | 4/1971 | Barth | 74/850 |

*Primary Examiner*—Clarence R. Gordon
*Attorney, Agent, or Firm*—A. M. Heiter

[57] ABSTRACT

A power train having a gas turbine engine with a controlled power transfer clutch between the compressor turbine and the load turbine driving a power shift transmission. The engine control system includes a fuel control and a power and torque program control responsive to compressor and auxiliary torque and speed controlling the power transfer clutch to provide engine output power and maintain constant high turbine inlet temperature in a wide range of operation for optimum efficiency. The power shift transmission control has shift control valving to selectively supply control pressure to the fluid operated drive motors to selectively establish neutral and a plurality of drives. A flow valve responsive to flow filling a motor for establishing a drive controls a power transfer clutch cut off valve to disconnect the power transfer clutch providing normal engine idle during establishment of a drive. Energizing the starter circuit requires first manually placing the transmission control in neutral and then discontinues fluid feed to the engine and transmission controls, unloads the engine and transmission pumps, disengages the power transfer clutch, provides a low idle throttle stop and further ensures positive neutral in the transmission. When the engine is started and the transmission control is in neutral, the engine power clutch is disengaged, the throttle stop is in low idle, the transmission is in positive neutral and only lubrication pressure is supplied to the transmission.

24 Claims, 1 Drawing Figure

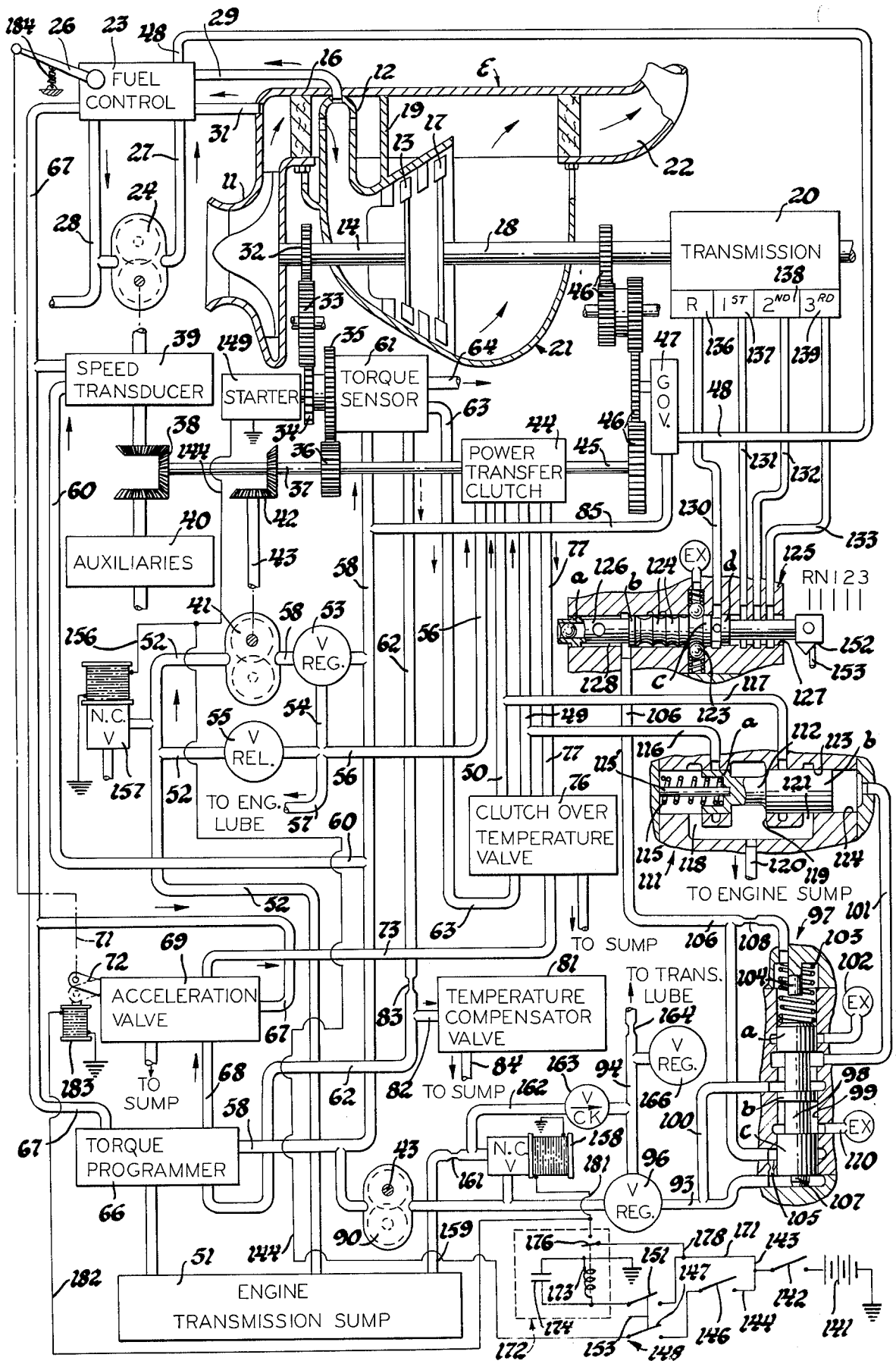

GAS TURBINE ENGINE POWER SHIFT TRANSMISSION POWER TRAIN

RELATED CASES

This application relates to applications Ser. No. 273,728 filed July 21, 1972 by Donovan L. Robinson for "Gas Turbine Engine Power Shift Transmission Power Train" Ser. No. 232,542 filed Mar. 7, 1972 by James M. Ricketts for "Gas Turbine Lubrication" and Ser. No. 235,966 filed Mar. 20, 1972 by Glenn W. Thebert for "Gas Turbine Lubrication."

BACKGROUND OF THE INVENTION

This invention relates to a power train and particularly a gas turbine engine having a power control and a power shift transmission having shift controls interrelated to the power control.

Regenerative gas turbine engines with power transfer clutches are known as shown in U.S. Pat. Nos. 3,077,074, John S. Collman et al. granted Feb. 12, 1963; 3,116,605 Charles A. Amman et al granted Jan. 7, 1964 and 3,237,404 E. E. Flanigan et al. granted Mar. 1, 1966.

In this invention, the gas turbine engine has operating controls to maintain the gas temperature at the turbine inlet at a proper consistent high value for maximum efficiency and provides programmed engine power and torque output characteristics. The operating controls include a manual fuel feed control regulated by compressor discharge pressure and compressor speed and a power transfer control regulating the engagement of a power transfer clutch to control the transfer of power between the output load turbine drive train and the compressor turbine drive train providing engine control. The torque and power output varies as a function of compressor speed and turbine speed as controlled by the manual fuel feed. The degree of engagement of the power transfer clutch is increased to increase engine torque and power output. The power shift transmission has a plurality of drive establishing devices selectively operated by manual or automatic means for shifting between a plurality of drives. Each drive establishing device provides drive establishment in response to the supply of fluid under pressure, which will initially be at a low value during fill and initial slipping drive engagement and then increase to a high valve for non slip drive, to a fluid motor operative to engage a drive. The transmission shift control has a control providing, during the initial slipping engagement of the drives, a control to reduce the engine power to normal idle. The transmission control has a flow responsive valve providing the cut off signal in response to shift establishment flow provided by the shift valving to a drive engaging motor to fill and initially establish a slipping drive. When the drive is substantial, non slip flow ceases and after a timed delay the cut off signal is discontinued. The cut off signal actuates an engine power transfer clutch cut off or overcontrol valve which overcontrols the engine controls for the engine power transfer clutch to reduce the transfer of power and thus reduce engine power and torque output to the normal idle value even though the fuel feed control position being set by the operator is above idle and also to reduce engine inertia. The starter circuit, when energized for starting the engine, disables the engine pump, preferably by venting the suction line to discontinue the feed to the series connected transmission pump and provide a positive neutral in the transmission and positive disengagemnt of the power transfer clutch. The transmission control in neutral dumps the transmission pump for positive neutral in the transmission but has a bypass transmission lubrication feed.

The full nature of the invention, these and further advantages, will be fully apparent from the following description.

The drawing is a schematic diagram of a regenerative free turbine power plant with power transfer clutch, a power shift transmission with shift control and interrelated with the power transfer clutch controls.

The engine E is preferably, although not necessarily, a regenerative engine of the known type described in U.S. Pat. No. 3,077,074 granted Feb. 12, 1963 to John S. Collman et al, U.S. Pat. No. 3,116,605 granted Jan. 7, 1964 to Amann et al. and U.S. Pat. No. 3,237,404 granted Mar. 1, 1966 to E. E. Flanigan et al; all of common ownership with this application. These engines, developed by the assignee of this invention, have been reported upon extensively in the technical literature. For this reason, and also because the present invention may be included in engines of various detailed structure the engine is shown schematically. The engine E includes centrifugal compressor 11, combustion apparatus 12, and a first or compressor turbine 13 coupled by a shaft 14 to the compressor. These structures are the basic elements of the gas generator. The compressed air is discharged from compressor 11 through a matrix 16 of a radial flow rotary regenerator into the combustion apparatus 12. The exhaust gas from the compressor turbine 13 flows through a second, load, or power turbine 17 supported on a power output shaft 18. Turbine 17 exhausts through the matrix 16 to the rear of a bulkhead 19 which divides the matrix into air flow and gas flow zones. Shaft 18 is coupled to the load by a suitable transmission 20 having output shaft 25. The engine is enclosed in a case or housing, indicated generally at 21, to confine the motive fluid. The exhaust gas, after passing through the matrix 16, may be discharged to atmosphere through an exhaust passage 22. This schematic shows only a single regenerator, but two may be employed as shown in the first two above-mentioned patents.

The primary control of the engine is of fuel flow to the combustion apparatus. Any appropriate fuel control 23 supplied with fuel by a pump 24 may be employed. Suitable fuel controls are well known, and including this invention in an engine does not require any additions to the fuel control.

Ordinarily, the vehicle operator controls the engine by a hand lever or foot pedal, such as a throttle lever 26 connected to the fuel control. The fuel supplied by the pump 24 is delivered through line 27 to the fuel control, and the excess is returned to the pump inlet through line 28, the engine fuel requirement being delivered to the combustion apparatus through line 29. Such fuel controls ordinarily include one or more fuel regulating or metering valves, which are variable throttling valves, and a head regulating valve which controls the metering pressure differential. They may include relief valves and various limiters or safety valves. Fuel flow may be regulated to prevent overspeed, overtemperature, or lean blowout but ordinarily is primarily responsive to some such suitable parameter as compressor discharge pressure. As indicated here, a line 31 pipes compressor discharge pressure into the fuel control. Such controls may include metering means responsive to engine speed and normally include governors to provide normal control or overspeed protection, or both. This matter will be referred to later.

As so far described, there is a power plant comprising any suitable free turbine engine and any convenient fuel supply and control means therefor. The pump 24 and other engine auxiliaries are ordinarily driven by the gas generator. A chain of gears for this purpose may include a driving gear 32 on shaft 14, idler gear 33, coaxial united gears 34 and 35, and a gear 36 on a main power transfer and accessory drive shaft 37. Shaft 37, through power take-off gearing 38 and the obvious shafting, drives pump 24, a gas generator speed transducer or responsive device 39, and miscellaneous engine or vehicle auxiliaries indicated by the block 40. An oil pump 41 is also driven by the power take-off shaft 37, gears 42 and shaft 43. The speed transducer or governor 39 may be of the type shown in the above U.S. Pat. No. 3,237,404 and may receive pressure fluid by branch line 60 of supply line 58.

With respect to the power transfer function, shaft 37 is connected by clutch 44 to shaft 45 and through a chain of transfer gears 46 to the power turbine output or transmission input shaft 18 and transmission 20. A speed transducer or governor 47 for indicating and control purposes is coupled to the power turbine by gears 46 to provide a governor signal in governor line 48 varying as a function of engine output or transmission input speed, as described below.

The power transfer clutch 44 is shown in detail in FIG. 2 of the above U.S. Pat. No. 3,237,404. It is preferably a multi-plate friction clutch in which the engaging force and, therefore, the torque capacity, is determined by a hydraulic piston. As will become apparent, such a clutch is merely representative of various controllable torque transmitting mechanisms that may be employed to couple the shafts 14 and 18 at varying speed ratios. The clutch described is provided for both power transfer and braking. Clutch 44 has a housing for a multiple friction clutch assembly and rotatably supports the driving and driven elements thereof and shafts 37 and 45. Clutch plates are splined to shaft 45 and rotate with the output shaft and friction disks are splined to shaft 37 and rotate with the input shaft, and both are slidable axially of the shafts.

The clutch is engaged by a double hydraulic motor which has two effective pistons defined by a single annular stepped piston. This piston is slidable in a stepped cavity which defines an inner or power transfer cylinder connected to power signal line 49 and an outer or brake cylinder connected to brake signal line 50. While it is not necessary to have two cylinders, it is preferable to provide a larger cylinder area for braking the load than for power transfer, since the torque during braking may be five or more times the maximum power transfer torque. The piston engages the clutch plates and disks to transmit torque.

Oil under pressure is supplied to the power transfer cylinder by power signal line 49 and is supplied to the brake cylinder by braking signal line 50. Since the clutch is operated as a slipping clutch, a flow of cooling oil is provided. This oil is supplied through a line 56.

The torque transferred by the clutch will be closely proportional to the engaging force exerted by the piston which is proportional to the sum of the products of the pressures in power and brake cylinders by the respective effective piston areas minus the force of retraction springs. The brake cylinder is used only to provide a high degree of friction to transmit relatively large amounts of power from the power turbine to the compressor to brake the output shaft on overrun. The power cylinder is supplied fluid under controlled pressure to determine the amount of torque transmitted in normal operation of the turbine at part-load. It is also energized to assist in providing clutching force for overrun braking, along with the brake cylinder.

The oil supplied to clutch 44 is circulated under pressure by pump 41 driven by the gas generator. This oil is drawn from a source such as the common engine transmission oil sump 51 through a suction line 52 and delivered by pump 41 to supply line 58. The supply line 58 is regulated at an intermediate value, i.e. 120 psi, by regulator valve 53 and is used for the engine controls. The regulator valve 53 provides overage in overage line 54 regulated at a low pressure by relief valve 55 with overage connection to suction line 52. The clutch cooling oil is supplied from overage line 54 through cooling line 56 to the clutch 44. The clutch cooling line 56 has a restricted branch 57 connected to the engine lubrication system.

One of the basic elements of control of power transfer in the system is a torque sensor 61, illustrated in detail in FIG. 3 of the above U.S. Pat. No. 3,237,404. The torque sensor responds to the torque transmitted through the intermediate gears 34, 35 from the gas generator turbine to the several auxiliary and power transfer shafts.

Controlled pressure servo oil regulated by valve 53 and supplied by line 58 enters the torque sensor. This pressure provides the torque signal input to means which supplies controlled pressure by power signal line 49 to the power cylinder to control the power transfer clutch 44 during normal drive. The brake or overrun signal line 50 during normal forward drive is connected to exhaust 64.

Under torque reversal the torque sensor 61 causes pressure in line 62 to drop to zero by connecting this line to exhaust 64. Thus, a no torque signal (zero pressure) is transmitted through line 62. This signal acts through the torque programmer 66 described in above U.S. Pat. No. 3,327,404 to control the system to cause full oil pressure to be applied through line 49 to the power cylinder of clutch 44. The torque sensor then connects line 58 to brake signal line 63 which is connected to brake cylinder line 50 to apply full pressure to the brake cylinder of clutch 44. The maximum piston area is thus available to lock up the clutch so as to transmit a torque corresponding to a desired large fraction of engine power rating, such as about 60% thereof.

In normal running, the power transfer clutch 44 is controlled to transmit a desired value of torque by comparing the measured torque from the torque sensor 61 with a desired torque or power transfer signal from a torque programmer 66. The torque programmer is an automatic valve which controls the power transfer clutch piston in response to inputs of actual torque output of the gas generator and actual speed of the gas generator. It acts upon oil supplied by pump 41 to clutch 44. The torque sensor pressure is transmitted through line 62 as explained above. The speed signal is a fluid pressure signal transmitted through line 67 from the speed transducer 39. Servo oil at controlled pressure is supplied through line 58 and branch 60.

The torque programmer valve 66, controlled by torque sensor pressure in line 62 and gasifier speed transducer pressure in line 67, supplies servo oil from supply line branch 58 to, or bleeds it from, torque programmer line 68 to sump for controlling the clutch 44, thus varying the torque. The amount of torque transferred is one factor which determines the operation of this valve. The clutch will therefore be controlled to maintain the transfer shaft torque output of the gas generator at a value which is a function of speed related to the characteristics of the particular engine so that turbine temperature is maintained substantially constant at varying power levels. The no torque signal upon torque reversal will always supply oil to line 68 regardless of engine speed.

The structure so far described, plus lines to contact the actuating oil to the clutch, constitutes a complete engine operating system. However, certain additional devices preferably include in the system are shown and described below. First, acceleration valve 69, interposed in the line from the torque programmer to the clutch, which improves the acceleration of the engine. Since the effect of the torque programmer is to maintain a high turbine temperature at part loads, there is not much margin for addition of fuel to accelerate the gas generator, both with regard to turbine temperature limits and the compressor surge threshold. The compressor operates closer to the surge line during power transfer. This is desirable to increase running efficiency, but it impedes acceleration. If the engine is running at light load, the gas generator will be turning well below full speed. To assume full load or to accelerate the load rapidly, it is necessary to accelerate the gas generator to full speed. This can be facilitated by temporarily cutting out the power transfer so that all of the power of the gas generator is available to accelerate it. While various means might be adopted, the acceleration valve 69 as shown in the above U.S. Pat. No. 3,237,404 is very simple and suitable for this purpose. This valve responds to substantial power increasing movements of the power control or throttle lever 26, connected by rod 71 and lever 72, to release or unload the power transfer clutch. It is not affected by small or slow movements.

Communication is normally maintained between the torque programmer and through the acceleration valve which connects to a line 73 leading to the clutch over-temperature valve 76 and line 49 to the power transfer cylinder of clutch 44. Slight movements of the throttle lever 26 will not shift the valve sufficiently to drain the clutch cylinder, but more substantial differences between the speed setting and actual speed will release fluid from the clutch, thus unloading the gas generator and improving its acceleration.

A further desirable element of the system is a clutch over-temperature valve 76. The purpose of this valve is to release or relieve the clutching or braking effort in response to too great generation of heat in the clutch because of overload and excess slip. For this reason, an automatic valve response to the temperature of cooling oil leaving the clutch may be connected in circuit with the brake and clutch cylinder energizing lines. The cooling oil discharged from the clutch flows through an exhaust line 77 to the clutch over-temperature valve 76 and is discharged from this valve to the sump. The power transfer clutch energizing line 73 enters valve 76 and is connected it to a line 49 leading to the power cylinder in the clutch. The brake energizing oil line 63 is connected through the over-temperature valve to line 50 which connects with the brake cylinder in the clutch.

The over-temperature valve 76 is a balanced spool valve responsive to cooling oil temperature and movable to cut off the two lines which carry servo oil to the clutch by an oil temperature responsive capsule exposed to cooling oil discharged from the clutch through line 77. Transfer clutch oil line 73 and the brake-engaging fluid line 63 are throttled and closed by the valve in response to over-temperature. The over-temperature valve is responsive to conditions indicative of possible clutch misuse, i.e. misoperation of the engine causing excessive clutch slippage.

Another element which may improve this system, under some conditions at least, is means for modifying the schedule of power transfer as a function of air temperature. The turbine inlet temperature of a gas turbine engine increases with increases in ambient air temperature. For constant turbine temperature, fuel, and therefore power, must be reduced as air temperature increases. The torque transfer schedule may vary as a function of ambient temperature, which is desirable to make the gas generator turbine inlet temperature insensitive to ambient temperature. The preferred mode of accomplishing this in the system lies in means for varying the valve of torque transmitted from the torque sensor to the torque programmer by action of a temperature compensator. The temperature compensator 81 is connected so as to bleed oil from the line 62 through a branch line 82. In addition, if the temperature compensator is employed, a restriction 83 is provided in the line 62 upstream of the branch line 82. Restriction 83 allows a pressure drop to be created in line 62 as oil is bled from it by compensator 81. The compensator 81 includes a valve variably throttling the passage from inlet line 82 to an outlet or sump port 84 controlled by a known temperature responsive device exposed to ambient atmosphere or engine inlet temperature, to open the valve and thus reduce the torque sense by the additional drop through orifice 83 as air temperature decreases. By thus reducing the torque sense, the torque programmer 66 closes off the supply of pressure oil to the power transfer clutch at a higher value of torque as air temperature decreases. The result is that the level of power transfer varies inversely to inlet or ambient air temperature.

The governor 47 is preferably a linear governor, constructed, for example, in accordance with U.S. Pat. No. 2,941,539 granted June 21, 1960 to L. O. Hewko and providing a governor signal in line 48 that varies as a linear function of the engine output or transmission input speed, since it is driven by gearing 46 or a member in the transmission and rotates at a constant ratio with the transmission input. A supply line branch 85 of supply line 58, provides control fluid to this governor. Governor line 48 may be connected to fuel control 23 to provide output speed control as required by some engine fuel controls. Governor 47 may also be made like the speed transducer of the above U.S. Pat. No. 3,237,404 or the pitot governor of U.S. Pat. No. 3,039,315 granted June 19, 1962 to R. M. Zeek and E. E. Flanigan which operates from lubricating oil and does not need supply branch 85. Both of these governors provide a governor signal that varies as an exponential function of speed.

The transmission control system requires a supply of control fluid during all phases of operation. When the transmission 20 does not have a fluid drive, a fluid coupling or a torque converter, the engine output shaft 18 will stall when the transmission output or vehicle is stationary and the transmission is in a ratio drive. However, the first turbine 13 will continue to drive the compressor 11 and auxiliary drive so pump 41 is driven providing engine control pressure in line 58 regulated by regulator valve 53.

The transmission control system has an engine compressor driven transmission pump 90 also driven by shaft 43 which drives pump 41. The transmission pump 90 is fluid connected in series with the engine pump 41, pumps fluid from the engine control supply line 58 and delivers the fluid to the transmission main line 93 at a high pressure, i.e. 230 psi, regulated by transmission regulator valve 96 with overage to transmission lubrication supply line 94. The pump 90 is located in the engine and driven by the auxiliary drive shafts 37 and 43. The pump 90 will provide transmission control fluid when the engine is idling or driving since it is driven by the compressor and regulated by regulator valve 96 which may be as shown in A-11,246 the above application Ser. No. 273,728 by Donovan L. Robinson.

The pump 90 may also be located in the transmission housing and driven by engine output or transmission input shaft. The oil sump 51 is a combined engine and transmission sump providing a common sump. The engine and transmission sump may be in separate engine and transmission housing portions but located at substantially the same liquid level and interconnected by a large passage.

FLOW VALVE

The flow valve 97 actuates the power transfer clutch cut off valve 111 to disengage the clutch 44 during each ratio drive establishing interval in response to fluid flow for establishing the drive. Flow valve 97 has a valve element 98 having lands $a$, $b$ and $c$ located in a bore 99 of uniform diameter. With the valve in the normally open position, as illustrated, the main line branch 100 and the ratio engaging signal line 101 are connected by the space between the lands a and b. The exhaust port 102 for the signal line 101 is blocked by the land 98a. A spring 103 positioned in one closed end of bore 99 urges the valve element 98 to this open position. A pin 104 mounted on the valve body locates and limits the compression of this spring. Main line 93 is connected to the other closed end of bore 99 and by restricted bypass passage 105 to ratio change line 106 at the port end connected to bore 99 and blocked by land c. The main line oil is connected by line 93 upstream of restricted passage 105 to the chamber in the end of bore 99 beneath the valve to act on the free end of land c spaced from the end of the bore by stud 107. Downstream of restriction 105, the ratio feed line 106 is connected, through restricted branch passage 108 to the opposite or spring chamber end of bore 99 to act on land 98a to assist the spring 103 to move the valve element 98 to this closed position.

The flow valve 97 in its normal open position is open and provides free flow from main line branch 100 to the signal line 101 to actuate power transfer clutch cut off valve 111. Spring 103 overcomes any small unbalance of opposing pressures or differential pressure between main line 93 pressure on land 98c and ratio feed line 106 pressure on land 98a caused by leakage flow due to downstream leakage to hold flow valve 97 in open position. When the oil flows through ratio change line 106 to effect establishment of a ratio drive by filling one of the ratio motors, the higher rate of flow from the main line 93 through restriction 105 to ratio feed line 106 creates a higher pressure difference between the oil in main line 93 acting on the end face of land c and the reduced pressure oil in ratio change line 106 which acts on the opposite end face of land 98a. The higher differential pressure raises or closes valve element 98 against spring 103 and connects signal line 101 to exhaust 102 and blocks main line branch 100 between lands $b$ and $c$. An excessive difference in pressure between main line 93 and ratio change line 106 will raise valve 98 against spring 103 further to connect these lines with less restriction momentarily via the bore 99 to limit the pressure differential to the amount needed to hold valve element 98 in the closed position. Thus the normal main line pressure supplied to ratio feed line 106 and applied to the ratio clutch motors is reduced during each shift interval until the ratio motor is substantially filled and rapid flow stops. The point of engagement of the ratio clutch motor at which the pressure is increased is controlled by the force of spring 103 and restricted passage 108. As the flow is reduced, the pressure differential is reduced and at a certain low pressure differential spring 103 opens the valve 98 at a time delay rate determined by the restriction of line 108. The exhaust 110 prevents leakage across land $c$.

SHIFT CONTROL VALVE

The shift control valve 125 shown in a manual type having a conventional ball detent 123 and detent grooves 124 to releasably hold the valve in each position but other manual and automatic shift controls may be used. The shift valve 125 has a valve element 126 having equal diameter lands $a$, $b$, $c$ and $d$ reciprocal in a bore 127. The main line pressure in ratio feed line 106 is connected to bore 127 between lands a and b in all valve positions and through central passage 128 in the valve element 126 to the space between lands c and d. This valve in each drive position, reverse R, first 1, second 2 and third 3, connects ratio feed line 106 to the reverse line 130, first line 131, second line 132 and third line 133. These lines are respectively connected to the fluid actuated drive engaging devices for engaging reverse 136, first 137, second 138 and third 139. In neutral position of manual shift valve 125, passage 128 in valve element 126 is blocked in bore 127 between lands c and d so there is no flow in ratio feed passage 106.

POWER TRANSFER CLUTCH OFF VALVE

The power transfer clutch cut off valve 111 is actuated by a ratio engaging flow signal supplied by the ratio engaging flow signal line 101 from the flow valve 97 to exhaust the power transfer clutch apply pressure to provide engine idle during the filling of a ratio apply motor during establishment of a ratio drive. Cut off valve 111 has a valve element 112 having equal diameter lands a and b mounted for reciprocation in bore 113 closed at both ends. When the transmission shift control valve 126 is in neutral or any drive position, the flow valve is in the open position supplying main line pressure by signal line 101 to the closed end 114 of bore 113 to act on land $b$ to hold valve element 112 against the bias of spring 115 in the closed position. A stop pin 115', fixed to the land a end of valve element 112, engages the end of the bore to limit valve element movement at the closed position and guides the spring. In this closed position, valve element lands a and b respectively block branch portions 116, 117 respectively of lines 49 and 50 so these pressure lines for engaging the power transfer clutch function as described above to engage the power transfer clutch.

When shift valve 125 is moved to engage a drive, during filling of the motor for establishment of the drive, flow closes flow valve 97 providing a signal by exhausting signal line 101 permitting the spring 115 to move valve element 112 so land $b$ engages the end of the bore, an exhaust or cut off position in which clutch apply lines 49 and 50, via branches 116 and 117, are connected respectively by exhaust ports 118 and 119 to the engine sump by sump line 120. The exhaust port 118 exhausts the spring chamber end of the bore in all valve positions and port 121 prevents leakage across land $b$.

The flow valve 97 and the power transfer clutch cut off valve 111 provides means responsive to drive establishing flow for the filling of a ratio motor or to the engaging of a drive to reduce or discontinue torque or power transfer by the power transfer clutch to reduce engine output torque and power. The flow valve is unresponsive to less flow required to make up leakage for maintaining a drive engaged. The flow valve 97 provides a main line pressure signal in signal line 101 in response to the drive establishing flow through restriction 105 causing a pressure drop and thus reduced pressure in ratio feed line 106 sufficient to move the flow valve element 98. If the further advantages of the flow valve, such as limiting this pressure drop and time delay on re-engagement are not needed, the ratio feed pressure in line 106 may be used as the cut off signal pressure and connected to the cut off valve like signal line 101 with a cut off valve spring 115 overcoming the reduced pressure but not drive maintaining pressure. The restriction 105 between the main line and ratio feed line provides this reduced pressure. It is preferred to use a flow valve located in the transmission control valve body to send a cut off signal to the cut off valve located with engine controls near the power transfer clutch. If this is not needed, the cut off valve 111 may directly control the exhaust of the power transfer clutch apply lines with connections and lands as shown in the cut off valve.

ENGINE STARTING AND TRANSMISSION CONTROL

The engine starting and transmission control circuit use the engine vehicle electric power source, a grounded battery 141 and key switch 142 supplying source conductor 143. The source conductor may be used to feed engine ignition, fuel controls, vehicle lights and other accessories. The source conductor is connected by starter circuit conductor 144 through the manual starter switch 146 and the starter neutral switch 147 of the dual neutral switch 148 to the grounded starter 149. The starter switching system may have other features of the above Glenn W. Thebert application Ser. No. 235,966. The dual neutral switch 148 has the above starter neutral and a transmission neutral switch 151 both normal spring opened and closed by cam 152 on the manual selector valve element 126 or a portion of the control linkage therefor. The cam in the neutral position of the manual valve 125 moves actuator rod 153 to close both switches 147 and 151. The starter conductor 144 may be connected by branch conductor 156 to the normally closed grounded engine pump solenoid valve 157 which opens when the starter circuit is energized.

The normally closed engine pump solenoid valve 157 normally closes the air vent so the pump 41 operates normally and when open during starting admits air to suction line 52 to unload engine hydraulic control system pump 41 so there is no fluid supply for engine and transmission controls during starter drive rotation. The transmission main line 93 is connected to the normally closed solenoid valve 158, which when energized, opens to exhaust main line 93 to exhaust line 159 and through restriction 161 to sump 51 to reduce main line pressure to a low valve, i.e. 60 psi, for lubrication feed. With transmission main line pressure at this low value, the transmission shift control is in positive neutral, as no drive can be engaged and the power transfer clutch cut off valve is in exhaust position providing a backup exhaust preventing engagement of the power transfer clutch 44.

The alternative lubrication line 162 is connected to exhaust line 159 upstream of restriction 161 so a low pressure flow is provided in alternative lubrication line 159 through one-way check valve 163 for alternative lubrication feed to lubrication line 94, when the overage fluid supply is discontinued in neutral by reducing the main line pressure to substantially unload the transmission pump. The lubrication feed line 94 supplies lubrication oil to the transmission through the restriction 164 of the lubrication system at a pressure lower than main line pressure regulated by the lubrication regulator valve 166.

The normally closed solenoid valve 163 is normally closed by a spring and energized by a circuit when the transmission is in neutral. When the manual valve 125 is in neutral position, cam 152 actuates rod 153 to close duel neutral switch 148 so the transmission neutral switch 151 connects source conduit 143 through conduit 171 to time delay relay 172. When switch 151 is closed the relay coil 173 and capacitor 174 connects in parallel to ground are energized and charged to close relay switch 176 connecting a branch 178 of conduit connected to conduit 171 between the switch 151 and source 143 through closed switch 176 to line 181 to energize and open grounded normally closed solenoid valve 158 on shifting the transmission to neutral. Also, when the relay closes switch 176 conduit 182 is supplied to energize accelerator stop solenoid 183. This solenoid in the normal spring biased position is located adjacent a portion of the throttle control linkage, such as lever 72, to stop the throttle linkage in a normal idle position and in neutral is energized to move the stop solenoid to a low idle position. The normal throttle retraction spring 184 holds the throttle control linkage against the stop solenoid to position the throttle in low idle in transmission neutral and in normal idle in other transmission control positions and permits manual throttle advance at anytime. The relay switch 172 has a capacitor 174 to hold the relay switch 176 closed a timed delay period after neutral switch 151 opens for a timed increase of shift pressure for a smooth shift from neutral to drive.

This starter control unloading of the engine pump 41 can be used to unload the pump during starting when the engine uses ball bearings which do not require lubrication supply during starting and the full feed control does not require a speed signal during starting and functions to prevent engagement of the power transfer clutch.

OPERATION

While the operation of the engine controls and the transmission controls are described above, we wish to summarize the interrelation operation of these controls. When starting the engine, the transmission is placed in neutral closing neutral switch 148. Then on closing key switch 142, relay 172 closes to energize and open normally closed solenoid valve 158 to position valve 158 to control transmission main line pressure in line 93 when it is provided at a low lubrication value so it is insufficient to engage any transmission drive and to hold the power clutch 44 cut off valve 111 in closed position so power clutch apply lines 49 and 50 are exhausted and thus conditioned to disengage the power clutch and the throttle stop solenoid 183 is energized for low idle position of the throttle stop. Then closing starter switch 146 will energize the starter and normally closed solenoid valve 157 to open a pump suction line air vent to unload engine control fluid pump 41. Since pump 41 does not supply fluid to the series connected transmission control pump 90, there is no fluid pumping to the engine and transmission controls and no load during starting. When the engine is started, starter switch 146 is opened discontinuing starter operation and deenergizing solenoid 157 to close the suction air vent so pump 41 supplies fluid at the intermediate pressure, i.e. 120 psi, regulated by regulator valve 53 to supply the engine control system. The regulator valve 53 overage is connected to engine lubrication line 57 and power transfer clutch cooling line 56 with pressure regulated at a lower value by relief valve 55. The engine control pressure line is connected to transmission pump 90 supplying transmission main line 93. As long as the transmission control valve 125 remains in neutral position, solenoid valve 158 is energized and open to control main line pressure at the reduced low lubrication valve and solenoid 183 remains in the low idle position. On shifting the transmission shift valve 125 from neutral to a drive position, relay 172 delays closing of solenoid valve 158 to delay the main line pressure rise until the flow valve 97 acts to take over control for a smooth shift and solenoid 183 moves to the normal higher idle stop position for driving. When the shift valve 125 is moved from neutral to a drive position or from one drive position to another, flow (from main line 93 through restriction 105, ratio feed line 106 and manual valve 125 to actuate a ratio motor) actuates flow valve 97 to exhaust signal line 101 and open power clutch cut off valve 111 to exhaust power clutch apply lines 49 and 50 for idle operation of the engine to reduce power and torque during a shift. When the shift is complete, the flow valve 97 opens, after a time delay, to supply signal line 101 to close power clutch cut off valve 111 for normal power clutch operation by the engine controls to provide higher power and torque as called for by the operator control of the fuel control.

It will be appreciated that the illustrative preferred embodiment of the invention may be modified.

It is claimed:

1. A power train comprising in combination; a power plant having fuel feed means, fuel feed control means for varying power plant power, combustion apparatus, power generating means including power turbine means and power plant control means controlling the power generating means of said power plant to provide increased power for increasing output power in an output power range; a power shift transmission having an input operatively connected to said power turbine means, a load output, a plurality of fluid operated drive establishing devices for establishing and maintaining established a plurality of ratio drives between said input and output; source means providing a source of fluid under pressure driven by said power plant and connected to said power plant control means; shift control means operatively connected to said source means and said fluid operated drive establishing devices and operative to selectively control the connection of said source means to said devices for selectively maintaining the drives established and selectively providing a disconnect condition; overcontrol means operatively connected to said shift control means and said power plant control means operative in response to said shift control means maintaining a drive established controlling said power plant control means for controlling said power plant for transmitting normal power under the control of said power plant control means and in response to the establishing of said disconnect condition by said shift control means overcontrolling said power plant control means to reduce power plant power.

2. The invention defined in claim 1 and said shift control means providing said disconnect condition which includes a positive neutral condition disestablishing all drives and a shifting condition gradually establishing a drive.

3. The invention defined in claim 1 and a starter operatively connected to said power plant; starter control means operatively connected to said source means, said starter and said shift control means; said starter control means operative only when said shift control means is in neutral position to start said power plant and to unload said source means; said power plant control means being responsive to unloading of said source to reduce power plant and said shift control means being responsive to unloading of said source to provide positive neutral.

4. The invention defined by claim 1 and said shift control means providing a positive neutral disconnect condition overcontrolling said power plant control means and fuel feed means to reduce power of the power plant and providing a shifting disconnect condition during a shift to a drive overcontrolling said power plant control means to reduce power of said power plant.

5. A power train comprising in combination; a gas turbine power plant having a gas generator including a compressor and combustion apparatus, turbine means gas-coupled to the gas generator, power transfer means operably connected between said compressor and said turbine means, power plant control means including fuel feed means controlling the gas generator and power transfer control means controlling said power transfer means to provide increased power transfer by said power transfer means for increasing output power in an output power range; a power shift transmission having an input operatively connected to said turbine means, a load output, a plurality of fluid operated drive establishing devices for establishing and maintaining established a plurality of ratio drives between said input and output and transmission control means including a source of fluid under pressure, shift control means operatively connected to said source and fluid operated drive establishing devices and operative to selectively connect said source to said devices for selectively establishing said drives and maintaining the drives established and overcontrol means operatively connected to said shift control means and said power transfer control means operative in response to said shift control means maintaining a drive established controlling said power transfer means for transmitting power under the control of said power plant control means and in response to the establishing of a drive controlling said power transfer control means to reduce power transmitted by said power transfer means under the control of said power plant control means to reduce power plant power during establishment of a drive.

6. The invention defined in claim 5 and said overcontrol means in response to establishing of a drive reducing the inertia of the power plant connected to said input.

7. The invention defined in claim 5 and said overcontrol means in response to establishing a drive completely disconnecting said power transfer means to reduce power plant power and inertia connected to said input.

8. The invention defined in claim 5 and said shift control means being operative in a neutral position to provide neutral in said transmission and to reduce the power transferred by said power transfer means to control said power plant to reduce engine power 9. The invention defined in claim 5 and a power plant starter, starter control means operatively connected to said starter and said transmission control system to disable said transmission control means to provide neutral in said transmission when said starter is energized for starting said power plant.

10. The invention defined in claim 9 and said starter control means being connected to said power transfer means and operative to reduce the power transferred by said power transfer means when said starter is energized for starting said power plant.

11. The invention defined in claim 5 and said source of fluid under pressure being driven by said compressor and connected to operate said power transfer means and said shift control means; a starter connected to drive said compressor and starter control means connected to said starter, and source to disable said source to relieve source load on said starter, to disable said power transfer means to reduce power plant power, to disable said shift control means to provide neutral in said transmission and to cause said starter to drive said compressor for starting.

12. The invention defined in claim 11 and said source having a suction air vent valve and said power transfer means and said operated drive devices of said transmission being fluid pressure actuated and being disabled by disabling the source by opening said suction air vent valve.

13. The invention defined in claim 5 and said shift control means being operative in neutral position to provide neutral in said transmission and to control the fuel speed means to provide a lower idle position.

14. The invention defined in claim 13 and said shift control means being operative in neutral position to reduce the power transferred by said power transfer means to reduce engine power.

15. A power train comprising in combination; a gas turbine power plant having a gas generator including a compressor providing a gas discharge pressure, fuel feed means and combustion apparatus, turbine means gas coupled to the gas generator, power transfer means operably connected between said compressor and said turbine means, power plant control means controlling said gas generator and power transfer means to provide increased power transfer by said power transfer means and increasing power plant output power; a power shift transmission having an input operatively connected to said turbine means, a load output, a plurality of fluid operated drive establishing devices for establishing and maintaining established a plurality of ratio drives between said input and output and a control system including a source of fluid under pressure, shift control means operatively connected to said source and fluid operated drive establishing devices and operative to selectively connect said source to supply for filling a selected operating device for selectively establishing each drive and to maintain the supply for maintaining pressure in the selected operating device for maintaining the drive flow responsive means operatively connected to said source and said shift control means operative in response to said supply for maintaining pressure to maintain the power transferred by said power transfer means under the control of said power plant control means and in response to said supply for filling reducing power being transferred by said power transfer means to reduce power plant power during the establishment of drives.

16. A power train comprising in combination; a gas turbine power plant having a gas generator including a compressor, combustion apparatus, a starter operatively connected to said compressor, turbine means gas-coupled to the gas generator, power transfer means operably connected between said compressor and said turbine means, power plant control means including fuel control means controlling the gas generator and power transfer control means controlling said power transfer means to provide increased power transfer by said power transfer means for increasing output power in an output power range; a power shift transmission having an input operatively connected to said turbine means, a load output, a plurality of fluid operated drive establishing devices for establishing and maintaining established a plurality of ratio drives between said input and output, a source of fluid under pressure driven by said power plant connected to said power transfer control means; shift control means operatively connected to said source and fluid operated drive establishing devices and operative to selectively connect said source to said devices for selectively establishing said drives and maintaining the drives established and starter control means including a source of power operatively connected to said starter, said shift control means and said power transfer control means operative in response to supplying power to said starter to start said power plant to control said shift control means to disestablish the drive of all drive establishing devices to provide positive neutral and to control said power transfer means to substantially disengage said power transfer means to reduce the load on said starter.

17. The invention defined in claim 16 and said source including a primary pump and said starter control means being operatively connected to said source to unload said pump during starting to prevent power transfer by said power transfer means and drive by said drive establishing devices.

18. The invention defined in claim 16 and said starter control means being operatively connected to said fuel control means to reduce idle fuel feed during starting.

19. The invention defined in claim 16 and said shift control means operatively connected to said power transfer control means operative in the neutral position to reduce the power transferred by said power transfer means and the power plant power output.

20. The invention defined in claim 19 and said shift control means operatively connected to said power transfer control means operative on any shift to a drive to reduce the power transferred by said power transfer means and the power plant power output.

21. A power train comprising in combination; a gas turbine power plant having a gas generator including a compressor, and combustion apparatus, turbine means gas-coupled to the gas generator, power transfer means operable connected between said compressor and said turbine means, power plant control means including fuel control means controlled the gas generator and power transfer control means controlling said power transfer means to provide increased power transfer by said power transfer means for increasing output power in an output power range; a power shift transmission having an input operatively connected to said turbine means, a load output, a plurality of fluid operated drive establishing devices for establishing and maintaining established a plurality of ratio drives between said input and output and transmission control means including a source of fluid under pressure, shift control means operatively connected to said source and fluid operated drive establishing devices and operative in neutral position to provide neutral and in drive positions to selectively connect said source to said devices for selectively establishing said drives and maintaining the drives established and overcontrol means operatively connected to said shift control means and said power transfer means operative in response to said shift control means maintaining a drive established controlling said power transfer means for transmitting power under the control of said power plant control means and in response to said shift control means in neutral position controlling said power plant control means to reduce power being transmitted by said power transfer means under the control of said power plant control means to reduce power plant power during establishment of a drive.

22. The invention defined in claim 21 and said shift control means being operative during a shift to a drive to control said power plant control means to reduce power transferred by said power transfer means and power plant output power.

23. A power train comprising in combination; a gas turbine power plant having lubrication means, a gas generator including a compressor providing a gas discharge pressure, fuel feed means and combustion apparatus, turbine means gas coupled to the gas generator, fluid operated power transfer clutch means having cooling and operably connected between said compressor and said turbine means, power plant control means including fuel control means controlling said fuel feed means providing high and low idle throttle stops and power transfer control means to provide increased power transfer by said power transfer means for increasing power plant output power; an electric starter connected to drive said compressor; a first and second pump driven by said compressor and each having an inlet and outlet; a common engine transmission sump; suction means connecting said sump to said first pump inlet and having a solenoid air vent valve normally closed for first pump operation and energized to open the suction air vent to disable the first pump; first regulator valve means having an overage line, regulating first pump outlet at an intermediate pressure connected first pump outlet to said power transfer control means and connecting overage to said overage line to said power plant lubrication means and to said power transfer clutch cooling means; a relief valve connected to said overage line to limit overage pressure to a low valve; said second pump inlet being connected to said first pump outlet; second regulator valve means connected to and regulating said second pump outlet at a high pressure and connecting overage to said transmission lubrication means; a solenoid dump valve means having a restricted passage normally closed to maintain second pump outlet pressure and energized to dump second pump outlet to said sump through said restricted passage; a one way supplemental lubrication feed line connecting said restricted passage upstream of the restriction for flow only to said transmission lubrication means; a power shift transmission having an input operatively connected to said turbine means, a load output, lubrication means, a plurality of fluid operated drive establishing devices for establishing and maintaining established a plurality of ratio drives between said input and output and a control system including shift control means operatively connected to said fluid operated drive establishing devices and operative in neutral to block fluid flow to said devices and in drive positions to selectively connect fluid for filling a selected device for selectively establishing each drive and to maintain the supply for maintaining pressure in the selected device for maintaining the drive, flow responsive means operatively connected to said second pump outlet, said shift control means and said power transfer control means operative to supply fluid and in response to said supply for maintaining first pump outlet pressure to maintain the power transferred by said power means under the control of said power plant control means and in response to said supply flow for filling dumping said first pump outlet to reduce power transferred by said power transfer means to reduce power plant power during the establishment of drives, said shift control means including means operative in said neutral shift position energizing said dump solenoid valve to provide insufficient pressure to operate said devices to insure neutral, to actuate said flow control means to dump said first pump outlet reduce power transfer and power plant power and to control said fuel control means to provide said low idle stop and starter control means operative only in neutral shift control means position to energize said air vent solenoid valve and said starter.

24. A power train comprising in combination; a combustion power plant; a starter operatively connected to said power plant; a power shift transmission having an input driven by said power plant, a load output and fluid operated drive establishing means operative on the supply of fluid thereto for establishing a plurality of ratio drives between said input and output; a source of fluid under pressure driven by said power plant; shift control means connected to said source and selectively connected to supply fluid to said fluid operated drive establishing means for selectively establishing drive operation and starter control means connected to said starter and said source operative to operate said starter to start said power plant and to discontinue said supply of fluid from said source to said shift control means for said fluid operated drive establishing device to provide a positive neutral; said source including a pump driven by said power plant, a high pressure regulator valve connected to said pump regulating said source pressure, a low pressure transmission lubrication system normally connected to said high pressure source and bypass valve means connected to said source and said starter control means operative for venting said source regulated by said high pressure regulator valve to said low pressure lubrication system to substantially unload said pump during starting.

* * * * *

UNITED STATES PATENT AND TRADEMARK OFFICE
CERTIFICATE OF CORRECTION

PATENT NO. : 3,899,877
DATED : August 19, 1975
INVENTOR(S) : Eugene E. Flanigan, Quinton L. Heintzelman, and James M. Ricketts It is certified that error appears in the above-identified patent and that said Letters Patent are hereby corrected as shown below:

Column 4, line 15, after "supply" (2nd occur.), insert -- in --

Column 4, line 20, "connection" should read -- connected --.

Column 5, line 16, "contact" should read -- conduct --.

Column 5, line 19, "include" should read -- included --.

Column 5, line 60, "response" should read -- responsive --.

Column 5, line 67, after "connected" insert -- through --.

Column 6, line 28, "valve" should read -- value --.

Column 8, line 32, "in" should read -- is --.

Column 8, line 54, "off" should read -- CUT-OFF --.

Column 8, line 58, "pressure" should read -- pressures --.

Column 9, line 23, "provides" should read -- provide --.

Column 10, line 18, "valve" should read -- value --.

Column 10, line 45, "connects" should read -- connected --.

Column 12, line 44, after "plant" insert -- power --.

Column 13, line 58, before "operated" insert -- fluid --.

Column 15, line 22, "operable" should read -- operably --.

Column 15, line 24, "controlled" should read -- controlling --.

Column 15, line 62, after "cooling" insert -- means --.

Column 16, line 45, after "power" (1st occur.) insert -- transfer --.

Signed and Sealed this sixteenth Day of March 1976

[SEAL]

Attest:

RUTH C. MASON
Attesting Officer

C. MARSHALL DANN
Commissioner of Patents and Trademarks